United States Patent
Rustomjee

(10) Patent No.: US 12,521,344 B2
(45) Date of Patent: *Jan. 13, 2026

(54) NON-AQUEOUS GEL COMPOSITION

(71) Applicant: Amaterasu Lifesciences LLP, Mumbai (IN)

(72) Inventor: Maharukh Rustomjee, Mumbai (IN)

(73) Assignee: Amaterasu Lifesciences LLP, Mumbai (IN)

( * ) Notice: Subject to any disclaimer, the term of this patent is extended or adjusted under 35 U.S.C. 154(b) by 526 days.

This patent is subject to a terminal disclaimer.

(21) Appl. No.: 18/163,115

(22) Filed: Feb. 1, 2023

(65) Prior Publication Data
US 2023/0172853 A1  Jun. 8, 2023

Related U.S. Application Data

(63) Continuation-in-part of application No. 16/630,864, filed as application No. PCT/IN2018/050463 on Jul. 17, 2018, now Pat. No. 11,638,691.

(30) Foreign Application Priority Data

Jul. 18, 2017 (IN) .............. 201721025474

(51) Int. Cl.
*A61K 9/06* (2006.01)
*A61K 9/00* (2006.01)
*A61K 47/02* (2006.01)
*A61K 47/34* (2017.01)
*A61K 47/36* (2006.01)
*A61P 17/02* (2006.01)

(52) U.S. Cl.
CPC .............. *A61K 9/06* (2013.01); *A61K 9/0014* (2013.01); *A61K 47/02* (2013.01); *A61K 47/34* (2013.01); *A61K 47/36* (2013.01); *A61P 17/02* (2018.01)

(58) Field of Classification Search
None
See application file for complete search history.

(56) References Cited

FOREIGN PATENT DOCUMENTS

| | | |
|---|---|---|
| EP | 3072915 A1 | 9/2016 |
| EP | 3143984 A1 | 3/2017 |
| WO | 2016052571 A1 | 4/2016 |
| WO | 2017003139 A1 | 1/2017 |
| WO | 2018143061 A1 | 8/2018 |

OTHER PUBLICATIONS

International Search Report issued in PCT/IN2018/050463, dated Nov. 16, 2018, pp. 1-4.

*Primary Examiner* — Michael V Meller
(74) *Attorney, Agent, or Firm* — ArentFox Schiff LLP

(57) ABSTRACT

A non-aqueous gel composition comprising silicone crosspolymer, silicone oil and a sweat and/or sebum absorbing agent wherein the composition is used to prevent or treat symptoms associated with a topical skin disorder in a human patient. The present invention also relates to method of preventing or treating a topical skin disorder using a non-aqueous gel composition.

18 Claims, 2 Drawing Sheets

| Ulcer Grade | Subject Number | Day 0 | Day 21 |
|---|---|---|---|
| 1 | 004 |  |  |
| 1 | 011 |  |  |
| 2 | 010 |  |  |
| 2 | 013 |  |  |
| 3 | 002 |  |  |
| 3 | 003 |  |  |

NON-AQUEOUS GEL COMPOSITION

CROSS-REFERENCE TO RELATED APPLICATIONS

This application is a Continuation-in-Part of U.S. patent application Ser. No. 16/630,864, filed Jan. 14, 2020, which is a National Stage Entry of PCT/IN2018/050463, filed Jul. 17, 2018, which claims priority to Indian Application No. 201721025474 filed on Jul. 18, 2017, the disclosure of which is hereby incorporated by reference in their entireties.

The present invention relates to a non-aqueous gel composition and its use to prevent or treat friction related skin irritation and dermatitis such as chaf, razor burns, itching, scar rash, groin rash/jock itch, diaper rash and/or bed sores on a skin surface. The non-aqueous gel composition of the present invention when applied on the skin surface demonstrates excellent anti friction properties, water repellant properties and abrasion resistance. The non-aqueous gel of the present invention imparts lubrication to skin surfaces, protects the skin surfaces from irritation, inflammation, chafing caused by friction and may assist in preventing injury to the skin surfaces, thus avoiding violation or infection of the surfaces. The non-aqueous gel of the present invention prevents aggravation of the friction related skin irritation and chafing due to presence of sweat or moisture.

BACKGROUND OF THE INVENTION

Skin when exposed to constant friction may become irritated, chaffed and could get injured or erupt as rashes (on inner thigh, under arm, under bra area, etc), groin itch, jock itch, diaper rash or bed sores. This can be a particular problem among many humans, whether caused by constant rubbing against another skin surface or by frictional exposure to an external surface such as cloth or solid surfaces depending upon the human's activity.

Chafing occurs where parts of the skin such as on the inner thighs, groin areas, armpits, nipples, sacral areas, back, etc. as a consequence of resistance from body parts rubbing jointly, or resistance from clothing and sweating. Chafing also occurs on the feet due to rubbing and friction with parts of footwear causing shoe bites and blisters, especially if it is new. Chafing mostly occurs around the bra line (in the women), nipples (in the men), inner thighs, groin areas, sacral areas and under arms. Chafing gets aggravated while undergoing physical activities such as walking, running, swimming, playing sports and other movement oriented activities. Hot and humid climatic conditions and bad lifestyle practices such as wearing synthetic or tight fitting clothes/footwear, overcrowding and excessive travel in congested areas further increases risk for chafing. It is also aggravated due to excess body weight in overweight and obese people, diabetics, bed ridden and immobile people (bound to wheel chairs or prosthesis), people suffering from thyroid and genitourinary disorders and immune compromised people. Causes of chafing are friction caused due to frequent motion—particularly, skin resistance against movable fabric, prosthetic, footwear or other parts of the person's skin.

Common symptoms of friction related skin irritation/dermatitis and chafing is painful stinging or burning feeling. Chafing is associated with rash, redness, tearing or scraping of the skin exposing the skin to possible infection. Use of products to soothe skin and alleviate chafing is well known, and there have been a variety of products available on the market to perform the required function such as powders, petroleum jelly, ointments, oils, lotions, creams and the like. Some of them such as ointments, lotions spread to the clothing and stain it, can block skin pores and are comedogenic and may later lose their adherence to the skin giving only short term relief. Particulate products may not provide to the human protection from chafing due to lower adherence to the skin and may actually aggravate the skin irritation due to lumps formed on sweating and results in need for frequent application.

Hence, there is a need for a skin protectant which can cover the surface and forms a continuous film which acts as a protective barrier and reduces the impact of friction to prevent and treat erythema and frictional dermatitis. However, most of the current remedies for chafing need to be applied frequently every couple of hours to maintain and give relief from the pain and irritation on the skin. This can be very inconvenient for patient as they need to frequently go to the rest rooms and apply the topical product, hence there is a need for a product with improved adherence and abrasion resistance resulting in a longer duration of protection.

Sweat and moisture play a crucial role and can aggravate friction and chafing significantly especially in hot and humid weather conditions; hence it is preferred to have a water repellent barrier so that sweat and moisture can be kept away from the skin surface and friction can be minimized. Chafing is aggravated by sweating and also sweat creates a breeding area for germs such as bacteria and fungus it causes irritation and skin diseases. Further, the germs could enter the body via skin tears and opening due to chafing. In order to avoid this phenomenon, the anti chafing composition of the present invention is preferred to have a skin protectant having water repellant properties and further may comprise antimicrobial and/or anti-inflammatory agents. Diaper rash is another skin condition which occurs in babies and senior citizens using diapers. This occurs due to friction between diaper edges and skin, and negligence in changing diapers by caretakers this leads to contact of the urine and faecal matter with the skin in groin and sacral areas leading to skin irritation and rashes. In this condition the skin is sore, red, scaly, painful and tender.

Another skin condition in senior citizens is bed sores or pressure ulcers or decubitus ulcers occurring due to injuries to the skin and underlying tissue, primarily caused by prolonged pressure on the skin and shear forces (caused by friction) and local microclimate. Friction increases the amount of shear force that the patient is subjected to, and the deformation of the tissues caused by shear forces contribute to the development of pressure ulcers. The local microclimate relates to the temperature and humidity at the skin surface and it is required to keep moisture away from the skin in order to reduce the occurrence of bed sores, this is achieved with a water repellent skin protectant barrier.

They can happen to anyone, but usually affect people confined to bed or who sit in a chair or wheelchair for long periods of time.

Bed sores or pressure ulcers can affect any part of the body that's put under pressure and friction. They're most common on bony parts of the body, such as the heels, elbows, hips and base of the spine, butt, back, tailbone, shoulder blades, rear of head, sacral area and groin.

The present invention relates to a gel composition which acts as a skin protectant and prevents or treats symptoms associated with chafing, diaper rash, groin rash, jock itch, pressure ulcer or bed sores.

RELATED ART

United States patent publication no. 20060159645 (referred to herein as '645 application; Applicant M/s JOHN- SON & JOHNSON) discloses silicone topical compositions for the prevention and/or treatment of chafing. The composition post application to the skin dries to a powder-like consistency. The '645 application does not suggest adhesive and abrasive resistant properties of the composition. The gel composition of the present invention forms a barrier film which lowers the friction on the skin surface post application. Further, it results in a smooth, non-powdery feel with good adhesive and abrasive resistant properties. Further, the composition of the present invention also has a long lasting effect.

U.S. Pat. No. 8,663,665 (referred to herein as '665 patent; assigned to M/S Momentive Performance Materials Inc.) teaches an anti-chafing composition comprising an effective amount of boron nitride. The gel composition of the present invention is devoid of boron nitride but still forms a film with low friction which has long lasting effect.

U.S. Pat. No. 9,393,261 (referred to herein as '261 patent; assigned to M/s Body Glide LLC) discloses an anti-chafing balm comprising chelated silver oxide. The gel composition of the present invention is devoid of the expensive silver oxide.

U.S. Pat. No. 8,778,406 (referred to herein as '406 patent; assigned to M/s Joyce Labs, LLC) teaches an aerosol composition with zinc oxide which prevents or mitigates irritation on the skin by protecting against or relieving chafing and itching. The gel composition of the present invention is not an aerosol composition and does not contain zinc oxide.

U.S. Pat. No. 6,949,249 (referred to herein as '249; assigned to M/s JOHNSON & JOHNSON) teaches a spray pumpable liquid composition which has suitable adherence to the skin. The gel composition of the present invention is a gel.

PCT publication WO2017213505 (referred to herein as '505) teaches antichafing spray compositions devoid of silicone elastomer crosspolymers. The gel composition of the present invention is a gel comprising silicone elastomer crosspolymers.

U.S. Pat. No. 9,511,034 (referred to herein as '034; assigned to M/S Biosilicote Inc.) teaches a method of treating burns, wounds, scars and keloids. The composition of the present invention prevents chafing and treats the abrasion of the skin surface caused by chafing by application of a single gel composition comprising silicone crosspolymers.

European Patent No. EP3072915 (referred to herein as '915; assigned to M/S Shin-Etsu Chemical Co. Ltd) discloses aqueous gel compositions. However, the present invention relates to non-aqueous gel compositions which are non-greasy and water repellant.

U.S. Pat. No. 8,716,383 (referred to herein as '383; assigned to M/S Millet Innovation) discloses manufacturing a protective layer for protecting skin and tissues in the vicinity of the skin. However, the present invention does not prepare a protective layer in the vicinity of the skin.

French Patent No. FR 2712487 (referred to herein as '487; assigned to M/S Millet Innovation) claims foot pads. However, the present invention does not suggest use as foot pads.

There is need for a non-aqueous gel useful in preventing or treating friction related skin irritation or dermatitis like with chafing, diaper rash, groin rash, jock itch, pressure ulcer or bed sores which is non-greasy, has improved adherence, is abrasion resistant and is water repellant.

OBJECT OF THE INVENTION

The object of the present invention is to provide a gel composition which provides a film with beneficial properties such as low coefficient of friction, adheres to the skin and is water repellant. Further, the film has high abrasion resistance resulting in longer duration of protection for the skin against irritation/injury due to friction.

Another object of the present invention is to provide a gel product as described above which can be applied to the affected area to keep the skin dry and prevent conditions such as Athlete's foot (tinea pedis), Jock Itch (Tinea Cruris), Ringworm (Tinea Corporis), Candidiasis and also prevent diaper rash and chafing commonly occurring in infants and geriatrics who are wearing diapers for long hours per day.

Yet another object of the present invention is to provide a gel composition to prevent or treat bed sores in a human patient.

SUMMARY OF THE INVENTION

A gel composition comprising of:
(a) one or more silicone crosspolymer in about 1 to about 50% w/w of the composition and silicone oil in about 50 to about 99% w/w of the composition;
(b) sweat and/or sebum absorbing agent in about 0.1 to about 25% w/w of the composition;
(c) optionally non-volatile film forming polymer in about 0.1 to about 25% w/w of the composition;
(d) optionally skin rejuvenating and/or soothing agent in about 0.1 to about 25% w/w of the composition;
wherein the composition when applied to the skin adheres to the skin with a work of adhesion of more than about 0.500 Newton·sec when measured by TA.XT plus texture analyzer or Brookfield Pro CT3 texture analyser using a mucoadhesive rig and forms a film with a coefficient of friction of less than 0.400 when measured by Automatic surface tester (ASTM D 1894).

In an aspect, the present invention relates to a method of preventing or treating a topical skin disorder comprising contacting skin surface of a subject in need thereof with a non-aqueous gel composition comprising of:
(a) one or more silicone crosspolymers selected from the group consisting of dimethicone/vinyldimethicone crosspolymers, dimethicone crosspolymers, phenyl vinyldimethicone crosspolymers, dimethicone/phenylvinyl dimethicone crosspolymers, cetearyl dimethicone/vinyldimethicone crosspolymer, vinyl dimethicone/methicone silsesquioxane crosspolymers, dimethicone/polyethylene glycol (PEG-10/15) crosspolymers, polyethylene glycol (PEG-15)/lauryldimethicone crosspolymers and mixtures thereof being present at 1% w/w-30% w/w of the composition;
(b) a silicone oil being present at about 50% w/w to about 99% w/w of the composition;
(c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w;
(d) optionally non-volatile film forming polymer in about 0.1 to about 25% w/w of the composition; and
(e) optionally skin rejuvenating agent and/or soothing agent in about 0.1 to about 25% w/w of the composition.

In another aspect of the present invention, the topical skin disorder is selected from the group consisting of irritation of skin, chafing, razor burn, itching or pruritus, scar rash, diaper rash, athlete's foot (tinea pedis), jock itch (tinea cruris), ringworm (tinea corporis) candidiasis, bedsores or pressure ulcers, dermatitis, dermatitis due to psoriasis, skin lesions, eczema, sunburn, skin atrophy, bruising, acne formation, acne scars, apoptosis, fungal infections, intertrigo, bacterial infections, calluses, warts, corns, photodamage, scars, keloids, lupus, ichthyosis, atopic dermatitis, chronic wounds, keratosis piralis, sebaceous cysts, warts, inflammatory dermatoses, keratosis, eczema, xerosis, lichen planus, nodular prurigo, microbial infection, seborrheic dermatitis, dandruff, miliaria and allergic reactions.

In another aspect of the present invention, the topical skin disorder is selected from the group consisting of irritation of skin, chafing, razor burn, itching or pruritus, scar rash, diaper rash, athlete's foot (tinea pedis), jock itch (tinea cruris), candidiasis, bedsores ore pressure ulcers, intertrigo, dermatitis, fungal infections, and bacterial infections.

In yet another aspect of the present invention, the silicone oil is selected from the group consisting of dimethicone, cyclopentasiloxane, simethicone, methyl dimethicone, methyl trimethicone, phenyl siloxyphenyltrimethicone, trisiloxane, and mixtures thereof.

In yet another aspect of the present invention, the non-volatile film forming polymer is trimethylsiloxysilicate.

In yet another aspect of the present invention, the skin rejuvenating agent and/or soothing agent is selected from curcumin, balloon vine extract, echium oil, blackcurrant seed oil, sunflower oil concentrate, tea tree oil, tulsi, neem oil, coconut oil, olive oil, geranium oil, lavender oil, cinnamon oil, calendula oil, tocopherol acetate, squalene, squalane, patchouli oil, lemongrass oil, lemon oil, calamine and combination thereof.

In another aspect, the present invention relates to a method of preventing or treating a topical skin disorder comprising contacting skin surface of a subject in need thereof with a non-aqueous gel composition comprising of:
(a) one or more silicone crosspolymers selected from the group consisting of dimethicone/vinyldimethicone crosspolymers, dimethicone crosspolymers, cetearyl dimethicone/vinyl dimethicone crosspolymer, dimethicone/polyethylene glycol (PEG-10/15) crosspolymers, and mixtures thereof being present at 1% w/w-30% w/w of the composition;
(b) a silicone oil selected from dimethicone, cyclopentasiloxane, and mixtures thereof being present at about 50% w/w to about 99% w/w of the composition;
(c) a sweat and/or sebum absorbing agent selected from the group consisting of silica silylate, fumed silica, magnesium alumina metasilicate, starch, and combinations thereof being present at 0.1% w/w-25% w/w; and
(d) optionally skin rejuvenating agent and/or soothing agent selected from calendula oil, calamine, tocopherol acetate, lavender oil, patchouli oil in about 0.1 to about 25% w/w of the composition.

In yet another aspect, the present invention relates to a method of preventing or treating a diaper rash comprising contacting skin surface of a subject having the diaper rash with a non-aqueous gel composition comprising of:
(a) one or more silicone crosspolymers selected from the group consisting of dimethicone/vinyldimethicone crosspolymers, dimethicone crosspolymers, phenyl vinyldimethicone crosspolymers, dimethicone/phenylvinyl dimethicone crosspolymers, cetearyl dimethicone/vinyl dimethicone crosspolymer, vinyl dimethicone/methicone silsesquioxane crosspolymers, dimethicone/polyethylene glycol (PEG-10/15) crosspolymers, polyethylene glycol (PEG-15)/lauryldimethicone crosspolymers and mixtures thereof being present at 1% w/w-30% w/w of the
(b) a silicone oil being present at about 50% w/w to about 99% w/w of the composition;
(c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w;
(d) optionally non-volatile film forming polymer in about 0.1 to about 25% w/w of the composition; and
(e) optionally skin rejuvenating agent and/or soothing agent in about 0.1 to about 25% w/w of the composition.

In yet another aspect, the present invention relates to a method of preventing or treating bed sores or pressure ulcers comprising contacting skin surface of a subject having the diaper rash with a non-aqueous gel composition comprising of:
(a) one or more silicone crosspolymers selected from the group consisting of dimethicone/vinyldimethicone crosspolymers, dimethicone crosspolymers, phenyl vinyldimethicone crosspolymers, dimethicone/phenylvinyl dimethicone crosspolymers, cetearyldimethicone/vinyldimethicone Crosspolymer, vinyl dimethicone/methicone silsesquioxane crosspolymers, dimethicone/polyethylene glycol (PEG-10/15) crosspolymers, polyethylene glycol (PEG-15)/lauryldimethicone crosspolymers and mixtures thereof being present at 1% w/w-30% w/w of the composition;
(b) a silicone oil being present at about 50% w/w to about 99% w/w of the composition;
(c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w;
(d) optionally non-volatile film forming polymer in about 0.1 to about 25% w/w of the composition; and
(e) optionally skin rejuvenating agent and/or soothing agent in about 0.1 to about 25% w/w of the composition.

In yet another aspect of the present invention, the non-aqueous gel composition is applied to the skin surface of a subject in need thereof for a time period ranges from 1 day to 180 days, or the composition is be applied until the chafing or irritation is alleviated or it can be used prophylactically on a chronic basis.

In yet another aspect of the present invention, the non-aqueous gel composition is applied to the skin surface of a subject in need thereof once in a day, twice a day or thrice a day.

In yet another aspect of the present invention, the non-aqueous gel composition is applied along with any other topical gels, creams, lotions, or solutions.

In yet another aspect of the present invention, the non-aqueous gel composition is an anti-chafing gel, and water repellant gel; and the non-aqueous gel composition has water repellency rate of more than 70 when tested by AATCC 22.

In yet another aspect of the present invention, the non-aqueous gel composition when applied to the skin of a subject adheres to the skin of the subject with a work of adhesion of more than about 0.500 Newton·sec when measured by TA.XT plus texture analyzer or Brookfield Pro CT3 texture analyser using a mucoadhesive rig.

In yet another aspect of the present invention, the non-aqueous gel composition when applied to the skin of a human forms a film with a coefficient of friction of less than 0.400 when measured by Automatic surface tester (method ASTM D 1894).

In yet another aspect of the present invention, the non-aqueous gel composition when applied onto the skin of a human forms an abrasion resistant film with abrasion resistance of at least 10 cycles as measured by abrasion test IS12673-1989 or ASTM D 3885.

In yet another aspect of the present invention, the method of preventing or treating a topical skin disorder using the non-aqueous gel composition comprises:
(a) one or more silicone crosspolymers selected from the group consisting of dimethicone/vinyldimethicone crosspolymers, dimethicone crosspolymers, phenylvinyldimethicone crosspolymers, dimethicone/phenylvinyl dimethicone crosspolymers, cetearyl dimethicone/vinyl dimethicone crosspolymer, vinyl dimethicone/methicone silsesquioxane crosspolymers, dimethicone/polyethylene glycol (PEG-10/15) crosspolymers, polyethylene glycol (PEG-15)/Lauryldimethicone crosspolymers and mixtures thereof being present at 1% w/w-30% w/w of the composition;
(b) a silicone oil being present at about 50% w/w to about 99% w/w of the composition; and
(c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w.

In yet another aspect of the present invention, the method of preventing or treating a topical skin disorder using the non-aqueous gel composition comprises:
(a) one or more silicone crosspolymers selected from the group consisting of dimethicone/vinyldimethicone crosspolymers, dimethicone crosspolymers, phenylvinyldimethicone crosspolymers, dimethicone/phenylvinyl dimethicone crosspolymers, cetearyldimethicone/vinyldimethicone crosspolymer, vinyl dimethicone/methicone silsesquioxane crosspolymers, dimethicone/polyethylene glycol (PEG-10/15) crosspolymers, polyethylene glycol (PEG-15)/Lauryldimethicone crosspolymers and mixtures thereof being present at 1% w/w-30% w/w of the composition;
(b) a silicone oil being present at about 50% w/w to about 99% w/w of the composition;
(c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w;
(d) trimethylsiloxysilicate, and
(e) a skin rejuvenating and soothing agent selected from the group consisting of: curcumin analogues, balloon vine extract, echium oil, blackcurrant seed oil, sunflower oil concentrate, tea tree oil, tulsi, neem oil, coconut oil, olive oil, geranium oil, lavender oil, cinnamon oil, calendula oil, calamine, tocopherol acetate, squalene, squalane, patchouli oil, lemongrass oil and lemon oil.

DESCRIPTION OF THE INVENTION

Figure 1:
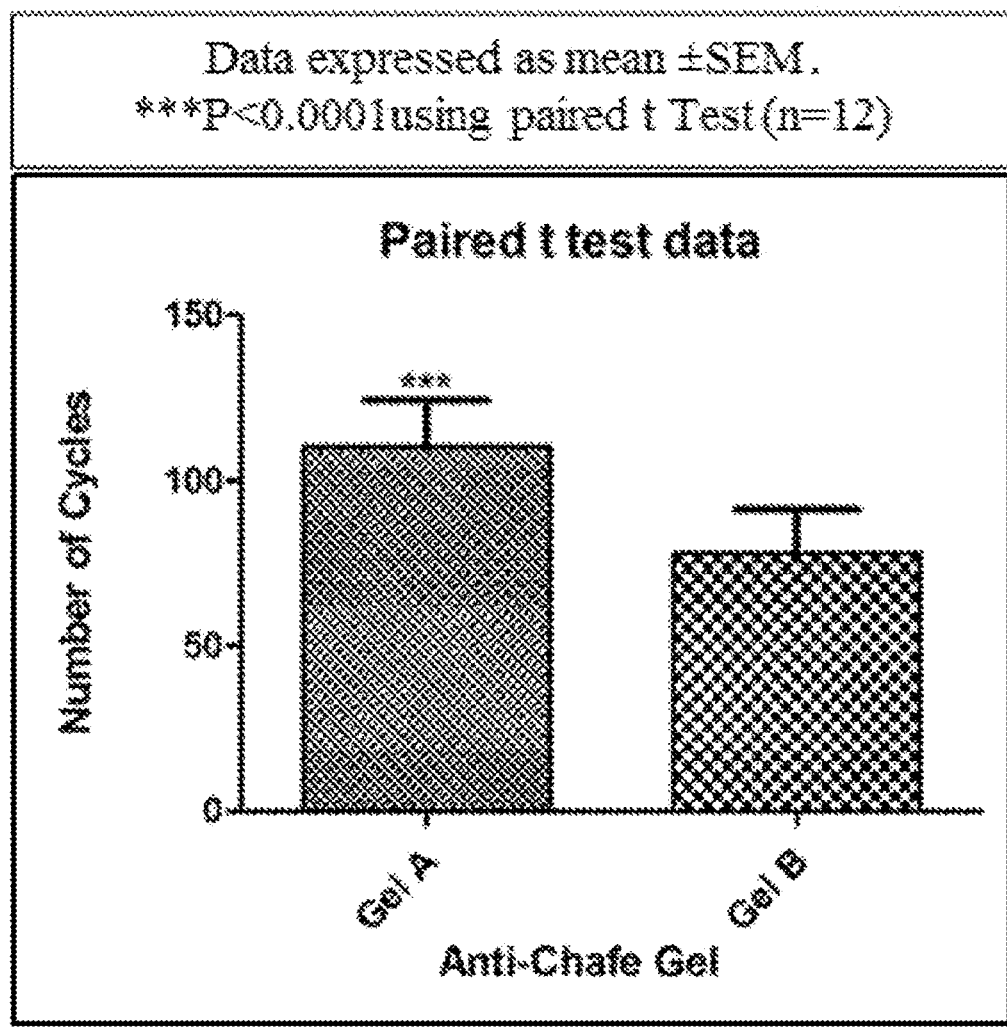
FIG. 1 illustrates the results of a Two tailed 'Paired t Test' of Abrasion Resistance Study on human panel in Example 5 wherein Gel A is the test product (composition of Example 3g) and Gel B is the marketed product (Refle sport).

Chafing is a friction-induced injury to the skin, ranging from minor irritation or abrasion where layers of the skin are worn away, or ruptured. Moisture, salts and minerals excreted as perspiration often aggravate, accelerate and exasperate chafing. The effects of chafing are seen, for example, as rash, redness, burning sensation and discomfort during movement. Chafing includes conditions of skin irritation and inflammation namely erythema and frictional dermatitis, leading to a feeling of burning and discomfort on movement. Use of compounds to soothe skin and alleviate chafing is well known, and there have been a variety of products available on the market to perform the required function.

Chafing is a simple problem with potentially large impact and chances of infection. It is commonly seen in intimate areas. Majority of fungal and yeast infections such as tinea cruris (jock itch), tinea corporis (ringworm) and candidiasis begin with chafing. Doctors strongly feel the need for an early intervention to prevent chafing.

Diaper rash is a common condition that can make babies as well as adults skin sore, red, scaly, and tender. The diaper rashes may be caused due to longer exposures on wet or soiled diapers, Chafing or Friction occurs due to rubbing of diaper edges with skin, direct contact between skin and urine and feacal matter and other irritants. Diaper rashes shows symptoms like inflammation, redness, itching, pai, discomfort. The composition of the present invention forms a film which acts as a protective barrier inhibiting direct contact between skin or urine, feacal matter and other irritants and creates a water repellent barrier to protect the skin surface and reduces the impact of friction, Sebum or sweat absorbent (sebum or other excreta, oozing fluid) keeps the area dry.

Pressure ulcers are also known as bedsores and decubitus ulcers. They range from closed to open wounds and are classified into a series of four stages based on how deep the wound is:
Stage 1 ulcers have not yet broken through the skin (Grade 1 pressure ulcer)
Stage 2 ulcers have a break in the top two layers of skin. (Grade 2 pressure ulcer)
Stage 3 ulcers affect the top two layers of skin, as well as fatty tissue. (Grade 3 pressure ulcer)
Stage 4 ulcers are deep wounds that may impact muscle, tendons, ligaments, and bone. (Grade 4 pressure ulcer)

Bedsores occur most often after a person sits or lies in one position for too long. Bed sores occur due to injuries to the skin and underlying tissue, primarily caused by prolonged pressure on the skin and shear forces (caused by friction) and local microclimate. The immobility further reduces blood circulation to specific parts of the body, damaging surrounding tissues.

Pressure ulcers form mainly on any skin that covers bony areas of the body. Common places for bedsores to develop include: butt, sacral area, groin, tailbone, heels, ankles, hips, back, elbows, shoulder blades, back of the head. In order to avoid this phenomenon the present invention comprises a protectant and moisture barrier against maceration caused by incontinence or body fluids, to protect sensitive, fragile skin and severely dry skin, including periwound areas. It forms a friction lowering protective, long lasting, water repellent barrier film on the skin.

In an embodiment, the present invention relates to a method of preventing or treating a topical skin disorder comprising contacting skin surface of a subject in need thereof with a non-aqueous gel composition comprising of:
  (a) one or more silicone crosspolymers selected from the group consisting of dimethicone/vinyldimethicone crosspolymers, dimethicone crosspolymers, phenyl vinyldimethicone crosspolymers, cetearyl dimethicone/vinyldimethicone crosspolymer, dimethicone/phenylvinyl dimethicone crosspolymers, vinyl dimethicone/methicone silsesquioxane crosspolymers, dimethicone/polyethylene glycol (PEG-10/15) crosspolymers, polyethylene glycol (PEG-15)/lauryldimethicone crosspolymers and mixtures thereof being present at 1% w/w-30% w/w of the composition;
  (b) a silicone oil being present at about 50% w/w to about 99% w/w of the composition;
  (c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w;
  (d) optionally non-volatile film forming polymer in about 0.1 to about 25% w/w of the composition; and
  (e) optionally skin rejuvenating agent and/or soothing agent in about 0.1 to about 25% w/w of the composition.

In another embodiment, the present invention relates to a method of preventing or treating a topical skin disorder comprising contacting skin surface of a subject in need thereof with a non-aqueous gel composition comprising of:
  (a) one or more silicone crosspolymers selected from the group consisting of dimethicone/vinyldimethicone crosspolymers, dimethicone crosspolymers, cetearyldimethicone/vinyldimethicone crosspolymer, dimethicone/polyethylene glycol (PEG-10/15) crosspolymers, and mixtures thereof being present at 1% w/w-30% w/w of the composition;
  (b) a silicone oil selected from dimethicone, cyclopentasiloxane, and mixtures thereof being present at about 50% w/w to about 99% w/w of the composition;
  (c) a sweat and/or sebum absorbing agent selected from the group consisting of silica silylate, fumed silica, magnesium alumina meta silicate, starch, and combinations thereof being present at 0.1% w/w-25% w/w; and
  (d) optionally skin rejuvenating agent and/or soothing agent selected from calendula oil, calamine, tocopherol acetate, lavender oil and patchouli oil in about 0.1 to about 25% w/w of the composition.

In another embodiment, the present invention relates to a method of preventing or treating a diaper rash comprising contacting skin surface of a subject in need thereof with a non-aqueous gel composition comprising of:
  (a) dimethicone/vinyl dimethicone crosspolymer and/or dimethicone crosspolymer being present at 4 to 9% wt/wt of the composition;
  (b) cyclopentasiloxane and/or dimethicone being present at about 75 to 90% w/w of the composition;
  (c) silica silylate, corn starch and/or magnesium alumina metasilicates being present at about 2 to 6% w/w of the composition; and
  (d) calamine, calendula, tocopherol acetate, lavender oil and patchouli oil being present at about 5 to 10% w/w of the composition.

In another embodiment, the present invention relates to a method of preventing or treating bed sores or pressure ulcers comprising contacting skin surface of a subject in need thereof with a non-aqueous gel composition comprising of:
  (a) dimethicone/vinyl dimethicone crosspolymer and/or dimethicone crosspolymer being present at 4 to 9% wt/wt of the composition;
  (b) cyclopentasiloxane and/or dimethicone being present at about 75 to 90% w/w of the composition; and
  (c) silica silylate, corn starch and/or magnesium alumina metasilicates being present at about 2 to 6% w/w pf the composition.

We have surprisingly found a gel composition which on application to the skin imparts dual properties of providing adhesion with a low coefficient of friction and is water repellant. The composition of the present invention has improved abrasion resistance leading to a long lasting action. It also provides a smooth and slippery feel.

According to one embodiment of the present invention is a gel composition comprising silicone crosspolymers and silicone oil wherein the composition when applied onto the skin in an effective amount adheres to the skin and forms an antifriction barrier film.

More specifically the gel composition of the present invention is an anti friction gel composition.

The compositions useful in the methods of this invention relate to non-aqueous or anhydrous compositions. The composition of the present invention is preservative, colourant and fragrance free resulting in a hypoallergenic composition.

The gel composition of the present invention adheres to the skin and with a work of adhesion of more than 0.400 Newton·sec when measured by TA.XTplus Texture analyzer or Brookfield Pro CT3 texture analyser using a mucoadhesive rig. Preferably, the work of adhesion is more than 0.500 Newton·sec when measured by TA.XTplus Texture analyzer and or Brookfiled Pro CT3 texture analyser using a mucoadhesive rig. The higher the adhesiveness, the better the ability of the composition to adhere to the skin surface to form a protective film.

The gel composition of the present invention exhibits a coefficient of friction below 0.400 when measured by Automatic surface tester (method ASTM D 1894). Preferably, the coefficient of friction is below 0.300 when measured by Automatic surface tester (method ASTM D 1894). A lower coefficient of friction reflects improved anti-friction property of the composition. Lowering of friction on the skin surface helps to reduce the friction which is the cause of chafing, reduces irritation and chafing.

Additionally, the gel composition of the present invention spreads well and provides a smooth and slippery feel as compared to the prior known powdery feel.

We have surprisingly found that marketed products have good adhesion properties and coefficient of friction but unfortunately they do not protect the skin for longer duration as they have poor abrasion resistance.

The gel composition of the present invention when applied onto a substrate in an effective amount also imparts abrasion resistance of at least 10 cycles when measured by abrasion test IS12673-1989 or ASTM D 3885. Preferably, abrasion resistance of at least 12 cycles when measured by abrasion test IS12673-1989 or ASTM D 3885. The higher the number of cycles the better the abrasion resistance and the gel is retained on the skin for a longer time. Further, the composition of the present invention when applied to the skin surface in an effective amount exhibits a significantly higher ability to be retained on the skin when exposed to forced abrasion using a dry sponge massager and thus providing a longer duration of protection.

The gel composition of the present invention is water repellant and exhibits a rating of more than 70 when tested by AATCC 22 or ISO 4920. Preferably, the water repellency rating is at least 80 when tested by AATCC 22 or ISO 4920. High water repellency rating ensures better protection of the skin from sweat and moisture related friction and chafing.

The gel composition of the present invention comprises silicone crosspolymers in about 1 to about 50% w/w of the composition. Preferably, the silicone crosspolymers is in about 1 to about 30% w/w of the composition.

The silicone crosspolymer(s) may have an average molecular weight in excess of 10,000 (e.g., between about 10,000 and 10,000,000). Examples of silicone crosspolymers included but not limited to dimethicone/vinyldimethicone crosspolymers, dimethicone crosspolymers, dimethicone/phenyl vinyldimethicone crosspolymers, cetearyl dimethicone/vinyldimethicone crosspolymer, vinyldimethicone/methicone silsesquioxane crosspolymers, dimethicone/PEG-10/15 crosspolymers, PEG-15/Lauryldimethicone crosspolymers and mixtures thereof.

The gel composition of the present invention comprises silicone oils in about 50 to about 99% w/w of the composition; included but not limited to dimethicone, cyclopentasiloxane, simethicone, methyl dimethicone, methyl trimethicone, phenyl siloxyphenyltrimethicone, trisiloxane, and the like. Preferably, silicone oils are in about 70 to about 99% w/w of the composition.

The gel composition may comprise silicone elastomer gels which are blends of silicone crosspolymers and silicone oils.

The gel composition of the present invention may also comprise additional excipients such as sweat absorption, sebum absorption, skin rejuvenating, soothing agents, non-volatile film forming polymer ranging from 0.1 to 25%.

The amount of excipients in the gel composition of the present invention may be varied within wide parameters, but should be in a sufficient amount for the composition when applied on the skin to act as an antifriction barrier film on the applied surface of the skin such that the gel suitably adheres to the skin, and in any event, the composition effectively inhibits or reduces irritation or chafing to the skin caused by rubbing, whether skin against skin or against another object including, but not limited to apparel and footwear.

The sweat and/or sebum absorbing excipient(s) used in the present invention may be selected from but not limited to silica silylate, magnesium alumina meta silicate, engineered particles of silica, silicic acids and any types of derivatives and modifications thereof. Suitable examples comprise polysilicic acids, silicic anhydride, fumed silica, hydrated silica, silica gel, silicate esters and/or silicate salts such as sodium silicate magnesium silicate, calcium silicate and all types of starch and starch derivatives. The sweat and sebum absorbing excipient(s) may be used in the range 0.1 to 25% by weight of the composition.

Preferred range of sweat and/or sebum absorbing excipient(s) when it does not comprise of starch is less than 3.0% by weight of the composition; more preferably about 0.1% to about 2.0% w/w of the composition. The preferred range of sweat and/or sebum absorbing excipient(s) when it comprises of starch is about 0.1 to about 15% w/w of the composition.

The non-volatile film forming polymer used in the present invention may be a composition of trimethylsiloxysilicate and the like. The non-volatile film forming polymer may be used in the range of about 0.1 to about 25% w/w of the composition. Preferably, about 0.1 to about 10% w/w of the composition.

The skin rejuvenating and/or soothing agent used in the present invention may be selected from curcumin analogs, Balloon Vine extract, Echium Oil, Blackcurrant seed oil, sunflower oil concentrate, tea tree oil, tulsi, neem oil, coconut oil, olive oil, geranium oil, lavender oil, cinnamon oil, calendula oil, calamine, tocopherol acetate, squalene, squalane, patchouli oil, lemongrass oil, lemon oil and the like. The skin rejuvenating and/or soothing agent may be used in the range about 0.1 to about 25% w/w of the composition. Preferably, about 0.1 to about 10% w/w of the composition.

The process used for the preparation of the composition of the present invention entails a cold mixing process without any heat. The crosspolymer gel(s) are mixed in a mixer and the excipients dispersed in cyclopentasiloxane and/or dimethicone are added to the crosspolymer gel(s) and mixed.

The gel compositions of the present invention may be packaged in a container that is well known by an artisan of ordinary skill, e.g., low density polyethylene tube or laminated aluminum tubes with a dispensing tip head.

According to yet another embodiment of the present invention is a method of preventing or treating symptoms associated with a topical skin disorder in a human patient, the method comprising contacting a skin surface in need of such symptomatic prevention or treatment with the gel composition in an amount and period of time effective to symptomatically prevent or treat the skin disorder or symptoms of the skin disorder.

The skin disorder may be irritation of skin, chafing, razor burn, itching or pruritic, scar rash, diaper rash, athlete's foot (tinea pedis), jock itch (tinea cruris), ringworm (tinea corporis) candidiasis, bedsores, dermatitis, dermatitis due to psoriasis, skin lesions, eczema, sunburn, skin atrophy, bruising, acne formation, acne scars, apoptosis, fungal infections, intertrigo, bacterial infections, calluses, warts, corns, photodamage, scars, keloids, lupus, ichtiosis, atopic dermatitis, chronic wounds, keratosis piralis, sebaceous cysts, warts, inflammatory dermatoses, keratoses, eczema, xerosis, lichen planus, nodular prurigo, microbial infection, seborrheic dermatitis, dandruff, miliaria and allergic reactions by application of gel composition of the present invention.

The symptoms associated with the skin disorder may be itching, burning, pain, discomfort, numbness, blisters, and tingling.

The gel composition of the present invention is applied to the skin one to three times daily. When used in treating chafing of one skin surface against another surface, the composition may be applied until the chafing or irritation is alleviated or it can be used prophylactically on a chronic basis. More preferably, the composition useful in the methods of this invention is applied to two or more surfaces that may come into contact with each other. The skin surfaces which come into contact with each other are the chafing prone areas and by application of the gel of the present invention the probability of chafing is reduced.

The human may also, in accordance with the methods of this invention, apply such compositions to his or her skin which may come into frequent contact with external clothing or shoes, in order to protect such skin from chafing, irritation and or blistering.

The human may also, in accordance with the methods of this invention, apply such compositions to his or her skin with diaper rash.

The human may also, in accordance with the methods of this invention, apply such compositions to his or her skin with bed sores or bedridden patients prone to bed sores.

In an embodiment of the present invention, the method of preventing or treating a topical skin disorder comprises applying the non-aqueous gel composition of the present invention to the skin surface of a subject in need thereof for a time period ranges from 1 day to 7 days, 1 day to 14 days, 1 day to 21 days, 1 day to 30 days, 1 day to 45 days, 1 day to 60 days, 1 day to 90 days, 1 day to 180 days. Preferably, the composition is applied for a time period of 1 day to 7 days, 1 day to 14 days, 1 day to 21 days, 1 day to 30 days, and 1 day to 45 days. More preferably, the composition is applied for a time period of 1 day to 7 days, 1 day to 14 days, 1 day to 21 days, 1 day to 30 days. The composition may be applied until the chafing or irritation is alleviated or it can be used prophylactically on a chronic basis especially for bedridden or immobile patients prone to bed sores or pressure ulcers and diaper rash.

In another embodiment of the present invention, the method of preventing or treating a topical skin disorder comprises applying the non-aqueous gel composition of the present invention to the skin surface of a subject in need thereof once in a day, twice a day or thrice a day.

In another embodiment of the present invention, the method of preventing or treating a topical skin disorder comprises applying the non-aqueous gel composition of the present invention to the skin surface of a subject in need thereof along with any other topical gels, creams, lotions, or solutions.

In another embodiment of the present invention, the non-aqueous gel composition is an anti-chafing gel, or water repellant gel.

Definition of Terms

As used herein, the term "anti-friction composition" means any topically applied composition comprising ingredients capable of reducing, relieving, or minimizing chafing from friction of human skin, particularly friction induced injury to the skin ranging from minor irritation or abrasion, resulting from the rubbing of skin against skin, clothing, shoes, or other materials. Chafing includes conditions of skin irritation and inflammation namely erythema and frictional dermatitis. Friction could be also caused in human using diapers leading to diaper rash. Friction can also cause shear on skin which can lead to bedsores in bedridden and immobile persons.

As used herein, the term "Abrasion resistance" means a property which allows a material to resist wearing off due to repetitive rubbing. The composition is expected to be retained on the skin for a longer time when it has a higher resistance to abrasion.

As used herein the term "Adhesiveness or Adhesive" is the force that resists the separation of two bodies in contact. The composition is expected to adhere to the skin when it has a higher work of adhesion.

As used herein, the term "Coefficient of Friction" means a value that shows the relationship between the force of friction between two objects and the normal force between the objects. It is the ratio of the force of friction between an object and a surface to the frictional force resisting the motion of the object.

As used herein the term "applied on to the skin in an effective amount" means the anti chafing composition being applied in an amount sufficient to cover the affected area of the skin.

As used herein the term "silicone elastomer gel" means a silicon crosspolymer blended with silicone oils.

The term, "subject" as used herein refers to an animal, preferably a mammal, and most preferably a human. The term "mammal" used herein refers to warm-blooded vertebrate animals of the class 'mammalia', including humans, characterized by a covering of hair on the skin and, in the female, milk-producing mammary glands for nourishing the young, the term mammal includes animals such as human, cat, dog, rabbit, bear, fox, wolf, monkey, deer, mouse, and pig.

As used herein the term "water repellant" refers to compositions when applied to a surface repel water or moisture and keep water away from the surface.

The following examples illustrate preferred embodiments in accordance with the present invention without limiting the scope of the invention.

EXAMPLES

Example 1: Compositions of the Invention

| Excipients | % w/w | | | | | | |
|---|---|---|---|---|---|---|---|
| | 1a | 1b | 1c | 1d | 1e | 1f | 1g |
| Dimethicone/VinylDimethicone Crosspolymer | 5.7 | 6.4 | 6.4 | 6.1 | 3.6 | — | — |
| Dimethicone crosspolymer | 1.4 | — | — | — | 4.5 | 8.7 | 6.9 |
| Cyclopentasiloxane | 81.1 | 90.5 | 90.4 | 89.2 | 75.9 | 75.3 | 77.1 |
| Dimethicone | 8.6 | — | — | — | 12.9 | 12.9 | 12.9 |
| Corn starch | 3.0 | 3.0 | 3.0 | 3.0 | 3.0 | 3.0 | 3.0 |
| Silica Silylate | 0.1 | 0.1 | 0.1 | 0.1 | 0.1 | 0.1 | 0.1 |
| Magnesium alumina metasilicate | 0.1 | | 0.1 | 0.1 | — | — | — |
| Trimethyl siloxy silicate | — | — | — | 1.5 | — | — | — |
| Total | 100 | 100 | 100 | 100 | 100 | 100 | 100 |

The above examples were prepared by a cold mixing process without using any heat. The crosspolymer gels were mixed in a mixer. Corn starch, silicates were dispersed in cyclopentasiloxane/dimethicone and added to the gel mass. Other excipients were added and mixed.

The examples of the above compositions were tested for adhesiveness, coefficient of friction and resistance to abrasion.

The examples were tested for their adhesiveness to confirm that the protective barrier film of the invention would adhere to the skin and ensure the required effect.

Adhesiveness test was carried out for the above mentioned compositions by using one of the method mention below and the test parameters of same were as follows:

Instrument Used: TA.XT.Plus Texture Analyzer.
  Probe: Mucoadhesion rig
  Test Mode: Tension Pre-Test Speed: 0.50 mm/sec.
  Test Speed: 0.10 mm/sec
  Post-Test Speed: 0.10 mm/sec
  Applied Force: 5.0 g
  Return Distance: 15.0 mm
  Contact time: 60 sec
Instrument Used: Brookfiled Pro CT3 Texture Analyser
  Probe: TA 10
  Test Mode: Compression
  Load cell: 100 g
  Fixture: TA-MA (Mucoadhesion rig)
  Number of cycles: 1
  Target type: stop @ load
  Target value: Varied
  Hold time: 30 sec.
  Trigger load: 1 g
  Test speed: 1 mm/s
Procedure:

Apply 200 µl of the sample on the sampling slot, measure the adhesiveness using the above parameters. Sample of a similar marketed product (Reflesport—marketed by Reckitt Benkiser) was also tested for adhesiveness. Sodium CMC gels were also prepared and tested as positive control and cyclopentasiloxane was tested as a negative control.

The coefficient of friction was tested on the following equipment using parameters as listed below
  Instrument Name: Automatic Surface Tester
  Model/Product No.: KES FB4-AUTO-A
  Make: KES KATO TECH CO. LTD. Japan.
  Method: Kawabata method (ASTM D 1894)

The samples (1 gm) were applied on a substrate of 20×20 cms size substrate and dried. The coefficient of friction was measured in the standard mode using 200 gms as the force applied and a friction contactor size of 10×10 mm.

| S No | Example | Coefficient of friction (MIU) |
| --- | --- | --- |
| 1 | Example 1a | 0.160 |
| 2 | Example 1c | 0.168 |
| 3 | Example 1f | 0.166 |
| 4 | Reflesport | 0.172 |

The above results confirm that the surface of the substrate after application of the compositions of the inventions demonstrate the ability to reduce the friction of the surface by more than 70% as all the values of the coefficient of friction are below 0.300 MIU.

The examples were also tested for resistance to accelerated abrasion to help understand the strength of the protective film to withstand rubbing off and give a longer duration of protection.

The abrasion resistance test was conducted using the following equipment and parameters:
  Standard Test Method No. customized based on ASTM D 3885/IS 12673-1989
  Type of Abradant used: Zero Emery Paper
  Type of Abrasion: Unidirectional
  Instrument Name: Universal Wear Tester
  Model/Product No.: M282
  Make: SDL ATLAS, HONG KONG
    Air Pressure Used: 4 psi
    Load Used: 0.5 lb
    Mode: Unidirectional
    Stroke Length: 1 inch

| Test ID | Work of Adhesion (Adhesiveness) N.sec | Test ID | Work of Adhesion (Adhesiveness) N.sec |
| --- | --- | --- | --- |
| Positive Control | | | |
| Sodium CMC 3% gel | 0.460 | Cyclopentasiloxane | 0.090 |
| Sodium CMC 4% gel | 0.792 | | |
| Test products | | | |
| Example 1a | 0.707 | Reflesport | 0.825 |
| Example 1b | 0.827 | | |
| Example 1c | 0.734 | | |
| Example 1d | 0.593 | | |
| Example 1 e | 0.690 | | |
| Example 1f | 0.716 | | |
| Example 1g | 0.482 | | |

Sodium CMC gels are reported in literature to have good adhesive properties and so the adhesive values of 3% and 4% gels could be considered as those desirable in the invention. The adhesiveness value of marketed product Reflesport and examples 1a, 1b, 1c, 1d, 1e, 1f and 1g were found to be good.

The coefficient of friction of the above examples was tested to understand the ability of the composition to reduce the friction on the surface on the substrate when applied.

The samples of the above example were mixed with a colourant and applied as a uniform layer on the substrate fabric. The films were dried and then subjected to abrasion on the equipment measured as number of cycles required to remove the coloured film.

The cycles required to peel off the film for the examples was as given below. A sample of the marketed product with a similar composition (Reflesport—marketed by Reckitt benkiser) was also tested for comparison

| S No | Example | Observation (No of cycle/s to peel off) |
|---|---|---|
| 1 | Example 1a | 50 |
| 2 | Example 1c | 15 |
| 4 | Reflesport | 05 |

1a and 1c showed very good adhesive values (above 0.500 N·sec) and abrasion resistance of more than 10 cycles.

Example 2: Compositions of the Invention

| Excipients | % w/w | | | | | | |
|---|---|---|---|---|---|---|---|
| | 2a | 2b | 2c | 2d | 2e | 2f | 2g |
| Dimethicone/Vinyl Dimethicone Cross polymer | 6.0 | 5.4 | 5.6 | 6.0 | 5.8 | 5.7 | 5.2 |
| Dimethicone crosspolymer | — | 2.1 | 1.4 | 0.7 | 0.7 | 0.7 | 2.1 |
| Cyclopentasiloxane | 89.0 | 76.5 | 81.2 | 85.8 | 85.2 | 84.6 | 76.6 |
| Dimethicone | — | 12.9 | 8.6 | 4.3 | 4.3 | 4.3 | 12.9 |
| Corn starch | 5.0 | 3.0 | 3.0 | 3.0 | 3.0 | 3.0 | 3.0 |
| Silica Silylate | — | 0.1 | 0.1 | 0.1 | 0.1 | 0.1 | 0.1 |
| Magnesium alumina metasilicate | — | — | 0.1 | 0.1 | 0.1 | 0.1 | 0.1 |
| Trimethyl siloxy silicate | | | | — | 0.75 | 1.5 | |
| Total | 100 | 100 | 100 | 100 | 100 | 100 | 100 |

The above examples were all prepared using the cold mixing process as explained in example 1.

The compositions were tested for adhesiveness, coefficient of friction and resistance to abrasion.

| Example No | Work of Adhesion N · sec | Coefficient of Friction MIU | Resistance to abrasion in no of cyles to peel off |
|---|---|---|---|
| Example 2a | 0.809 | — | — |
| Example 2 b | 0.762 | — | — |
| Example 2 c | 0.696 | — | 60 |
| Example 2 d | 0.671 | 0.252 | 60 |
| Example 2 e | 0.646 | — | 45 |
| Example 2 f | 0.637 | — | 60 |
| Example 2 g | 0.701 | 0.222 | 30 |

The examples demonstrated good adhesiveness properties along with a low coefficient of friction. Further, many of them exhibit a significantly a very good resistance to abrasion as compared to the marketed sample. Thus, the inventive composition has a longer retention on the skin and expected to have a longer duration of anti friction action when applied to the skin.

Example 3: Compositions of the Invention

| Excipients | % w/w | | | | | | | |
|---|---|---|---|---|---|---|---|---|
| | 3a | 3b | 3c | 3d | 3e | 3f | 3g | 3h |
| Dimethicone/VinylDimethicone Cross polymer | 5.3 | 5.8 | 5.6 | 5.6 | 7.2 | 5.3 | 5.7 | 5.6 |
| Dimethicone crosspolymer | 0.8 | 0.7 | 0.7 | 0.7 | — | 0.8 | 1.4 | 0.7 |
| Cyclopentasiloxane | 83.5 | 83.5 | 81.4 | 81.4 | 85.9 | 78.5 | 81.0 | 81.9 |
| Dimethicone | 5.2 | 4.3 | 4.3 | 4.3 | 3.8 | 5.2 | 8.6 | 4.3 |
| Corn starch | 5.0 | 5.0 | 7.0 | 7.0 | 3.0 | 5.0 | 3.0 | 7.0 |
| Silica Silylate | 0.1 | 0.5 | 1.0 | — | 0.1 | 0.1 | 0.1 | 0.5 |
| Magnesium alumina metasilicate | 0.2 | 0.25 | — | 1.0 | 0.1 | 0.2 | 0.2 | — |
| Black currant seed oil, balloon vine extract, sunflower oil concentrate in Octyldodecanol | — | — | — | — | — | 5.0 | — | — |
| Tocopherol acetate | | | | | | | 0.5 | 0.5 |
| Almond oil | | | | | | | 0.5 | — |
| Silica | | | | | | | 0.3 | – |
| Calamine | | | | | | | | 3 |
| Calendula oil | | | | | | | | 1 |
| Lavender oil | | | | | | | | 0.2 |
| Patchouli oil | | | | | | | | 0.1 |
| Total | 100 | 100 | 100 | 100 | 100 | 100 | 100 | 100 |

The above examples were all prepared using the cold mixing process as explained in example 1.

The compositions were tested for adhesiveness, coefficient of friction and resistance to abrasion.

| Example No | Work of Adhesion N · sec | Coefficient of Friction MIU | Resistance to abrasion in no of cyles to peel off |
| --- | --- | --- | --- |
| Example 3 a | 0.646 | 0.272 | 14 |
| Example 3 b | 0.638 | — | — |
| Example 3 c | 0.186 | — | — |
| Example 3 d | 0.680 | — | — |
| Example 3 e | 0.732 | — | — |
| Example 3 f | 0.837 | — | — |
| Example 3g | 0.695 | 0.260 | 13 |
| Example 3h | 0.555 | — | — |
| Example 3i | 0.550* | | |
| Example 3j | 0.400* | | |
| Example 3k | 0.660* | 0.370 | |

*Measured by Brookfiled Pro CT3 texture analyser

Example 4: Exemplary Compositions of the Invention

| Ingredient | Function | Optional/Required |
| --- | --- | --- |
| Dimethicone/VinylDimethicone Cross polymer | Film forming agent, thickener and Gel forming agent | Required |
| Dimethicone crosspolymer | Film forming agent, thickener and Gel forming agent | Required |
| Phenyl vinyl Dimethicone crosspolymers | Film forming agent, thickener and Gel forming agent | Required |
| Vinyl dimethicone/Methiconesilsesquioxane crosspolymer | Film forming agent, thickener and Gel forming agent | Required |
| Dimethicone/PEG-10/15 crosspolymer | Film forming agent, thickener and Gel forming agent | Required |
| PEG-15/lauryl dimethicone crosspolymer | Film forming agent, thickener and Gel forming agent | Required |
| Cyclopentasiloxane | Base Vehicle - Silicone oil/fluid | Required |
| Trisiloxane | Base Vehicle - Silicone Oil/fluid | Required |
| Methyl Trimethicone | Base Vehicle - Silicone Oil/fluid | Required |
| Diphenyl siloxy phenyl Trimethicone and/or phenyl silicone oils | Base Vehicle - Silicone Oil/fluid | Required |
| Dimethicone | Base Vehicle - Silicone oil/fluid | Required |
| Corn starch | Sebum and Sweat absorbent | Required |
| Silica Silylate | Sebum and Sweat absorbent | Required |
| Silicate Esters | Sebum and Sweat absorbent | Required |
| Silicate Salts | Sebum and Sweat absorbent | Required |
| Sodium silicate | Sebum and Sweat absorbent | Required |
| Calcium Silicate | Sebum and Sweat absorbent | Required |
| Magnesium alumina metasilicate | Sebum and Sweat absorbent | Required |
| Polysilicic Acid | Sebum and Sweat absorbent | Required |
| Fumed Silica | Sebum and Sweat absorbent | Required |
| Hydrated Silica | Sebum and Sweat absorbent | Required |
| Silicic Anhydride | Sebum and Sweat absorbent | Required |
| Trimethyl siloxysilicate | Film forming agent | Optional |
| Curcumin Analogues | Skin rejuvenating and soothing agent | Optional |
| Balloon vine extract | Skin soothing agent | Optional |
| *Echium* Oil | Skin soothing agent | Optional |
| Black Current Seed oil | Skin soothing agent | Optional |
| Sun flower Oil Concentrate | Skin rejuvenating oil and soothing agent | Optional |
| Tea tree oil | Skin soothing agent | Optional |
| Tulsi oil | Skin rejuvenating oil and soothing agent | Optional |

Example 5: Abrasion Resistance Study on Human Panel

Abrasion Resistance Study on Human Panel:
Resistance to Accelerated/forced Abrasion study on human panel;

Study Plan: 6 healthy male participants and 6 healthy female participants were selected. The study was a single blind crossover clinical study, in which participants were subjected to test and marketed product simultaneously one on each arm.

Gel A is the test product (composition of Example 3g) and Gel B is marketed product (Refle sport)

Procedure and Protocol:

A fixed and known amount of gel i.e., 0.1 gm was applied of the test and marketed product on a 4 cm diameter patch on the fore arm of the participants (the final concentration being 7.96 $mg/cm^2$) and allowed to air dry. Individual formulations namely Gel A (Test product) and Gel B (marketed product) were applied on any of the arm (right/left) based on pre-decided coding system. After the patch was completely dry, sponge massager was used for abrading the patch in clockwise circular motion. The process was repeated at specific intervals until the film fades away.

Observations:
- Gel A and gel B both had the same transparent appearance
- Upon application both gel A and gel B had the same viscous texture and were easy to apply, formed a smooth, silky, non powdery, matt like film which easily air dried in 30 mins.
- Gel A was found to have higher retention on the skin as compared to Gel B when exposed to forced abrasion using a dry sponge massager. The number of cycles required to peel off the gel film was measured for each volunteer.

Mean, SEM and SD of the Number of Cycles Required for Abrasion in all the Study Participants (06 Males and 06 Females)

| Sr. No. | Gel A Cycles | Gel B Cycles |
|---|---|---|
| 1 | 75 | 35 |
| 2 | 60 | 50 |
| 3 | 50 | 35 |
| 4 | 100 | 50 |
| 5 | 60 | 35 |
| 6 | 125 | 85 |
| 7 | 100 | 75 |
| 8 | 115 | 100 |
| 9 | 135 | 70 |
| 10 | 150 | 100 |
| 11 | 130 | 100 |
| 12 | 225 | 200 |
| Mean | 110.4 | 77.9 |
| SEM (Standard Error of Mean) | 31.9 | 22.5 |
| SD (Standard Deviation) | 48.7 | 46.3 |

The results obtained from the clinical trial were subjected to two tailed 'Paired t Test' using Graph Pad Prism Software. FIG. 1 depicts the graph obtained applying Statistics using number of cycles as the variable.

Tabular Results:

| Table Analyzed | Paired t test data |
|---|---|
| Column A | Gel A |
| vs | vs |
| Column B | Gel B |
| Paired t test | |
| P value | P < 0.0001 |
| P value summary | *** |
| Are means signif. different? (P < 0.05) | Yes |
| One- or two-tailed P value? | Two-tailed |
| t, df | t = 6.734 df = 11 |
| Number of pairs | 12 |

Discussions and Conclusion:

The study was based on comparison between two gels on same person hence two-tailed paired t test was applied to the data. Probability (P) of less than 0.05 is significant i.e., confidence interval is ~95% when evaluated for cycles need to peel off the film. In this case P is 0.0001 for cycles need to peel off, hence it is statistically significant. This proves that Gel A takes higher resistance time and cycles to get removed from skin.

In the present invention we have made use of an accelerated abrasion test as a surrogate measurement to estimate the residence time on the skin when used by consumers in real life situation. Thus according to the data obtained, abrasion resistance of anti-chafe product (Gel A) of example 3g has a significantly longer residence time on skin after application when compared with the marketed product—Reflesport (Gel B).

Example 6: Water Repellency Test

Water repellency test confirms with following international standards: AATCC 22 & ISO 4920. Water repellency test performed using instrument: Spray rating tester (make: SDL ATLAS). Apply 2.77 g of sample on the substrate (Polyester fabric) having area of 176.71 $cm^2$ (15 diameter). Kept this substrate at RT for 30 minutes for saturation. After 30 minutes. Later pour 250 ml of distilled water at normal temperature into the funnel and spray the whole quantity on the test specimen for a period of 25-30 sec. Now detach the metal hoop from the stand. Confirm whether water had penetrated to the back of the test specimen. With the face side of the test specimen down, hold the metal hoop by one edge and tap the opposite edge lightly once against the table. Then rotate it 180° C. and similarly tap again once on the point previously held to remove any excess water drop. The final step is to compare the wetting of the specimen with a photographic rating standard and grade it accordingly. Substrate as such was considered blank and same procedure was followed without sample.

Standard Spray Test Ratings Chart

| Observation | Standard spray test Ratings |
|---|---|
| 100 | No sticking or wetting of the specimen face |
| 90 | Slight ramdom sticking or wetting of the specimen face |
| 80 | wetting of the specimen face at spray points |
| 70 | Partial wetting of the specimen face beyond the spray points |
| 50 | Complete wetting of the specimen face beyond the spray points |
| 0 | Complete wetting of the specimen face |

| Example no. | Water repellancy Rating |
|---|---|
| 3a | 80 |
| 3g | 100 |
| 3k | 80 |

To conclude the water repellency rating shows the gel of present invention has good water repellency.

Example 7: Clinical Study

A. For Baby

| Subjects | Age | Number of Subjects |
|---|---|---|
| Healthy babies (boys & girls) | 0 month-3 years | 50 |

This home use study was conducted by an independent clinical research organization in a protocol driven study including suitable inclusion and exclusion criteria, respondents who had babies suffering from diaper rash were enrolled in the study. Samples were distributed to the respondents and they were trained for product usage for 14 days in diaper rash areas. After 14 days of daily use, the respondents were asked to self-assess the product efficacy and safety using a questionnaire and data was collated into the final report.

Product Application: The diaper rash area was cleaned with water and, it was dried thoroughly. Small (pea sized) quantity of Gel of present invention Example no 3K was taken on the finger. IT was spread evenly with the finger on diaper rashes or rash prone area such as buttocks, diaper lining area, groin, inner thighs, folds between buttocks and skin. It was allowed to dry on its own, massaging was not allowed. The product was applied twice a day or before change of diaper after cleaning and drying the skin on above mentioned areas for the period of 14 days.

The subjects were asked to answer self-assessment questionnaire after 14 days of application of Gel of present invention in order to evaluate the overall appraisal and attitude of the subjects towards the efficacy, safety, cosmetic characteristics of the product under test.

Results were presented in the form of tables of number and frequency of the answers for each proposal. Percentages were calculated by taking into consideration the total number of answers.

Results

Answers to Some of the Key Self Assessment Questions Given by the Respondents are as Below:

| Questions | Strongly disagree | Somewhat disagree | Neutral | Somewhat agree | Strongly agree |
|---|---|---|---|---|---|
| Do you feel the investigational product provides relief from rash discomfort to baby's skin? | 0% | 0% | 0% | 38% | 62% |
| Do you feel the investigational product helps in reducing rashes? | 0% | 0% | 0% | 38% | 62% |
| Do you feel the investigational product reduces chafing or rubbing of baby's skin with diaper/cloth? | 0% | 0% | 0% | 44% | 56% |
| After regularly using the investigational product, do you feel there is appearance of new rashes on baby's skin | 48% | 52% | 0% | 0% | 0% |
| For how long does the relief rash discomfort last since application of investigational product | <2 hrs | 2-5 hrs | 5-7 hrs | 8-10 hrs | >10 hrs |
| | 0% | 8% | 68% | 24% | 0% |

Conclusion:

The gel of the present invention is 100% efficacious in providing relief from baby diaper rashes and symptoms of diaper rashes. The relief from diaper rash after application of Gel lasts up to 10 hours in 24% of cases, up to 7 hours in 92% cases & up to 5 hours in rest of the cases. All 50 subjects reported that there was no appearance of new diaper rashes after regular use for 14 days and hence the gel of the present invention was able to prevent formation of diaper rash. 100% of the subjects who used the gel of present invention found it to be safe and does not cause any burning sensation upon its use. 100% of users confirmed it is non-sticky, easy to use and helps skin moisturization. Overall the gel of present invention is safe and efficacious in providing relief from baby diaper rashes.

B for Adult:

| Subjects | Age | Number of Subjects |
|---|---|---|
| 50 healthy male and female subjects | 50 to 85 years old | 50 |

This home use study was conducted by an independent clinical research organization in a protocol driven study including suitable inclusion and exclusion criteria. Samples were distributed to the respondent and they were trained for product usage for 14 days in diaper rash areas. After 14 days of daily use, the respondents were asked to self-assess the product efficacy and safety using a questionnaire and data was collated into the final report.

Product Application: The diaper rash area was cleaned with water and, it was dried thoroughly. Small (pea sized) quantity of Example no 3K was taken on the finger. It was spread evenly with the finger on diaper rashes or rash prone area such as buttocks, diaper lining area, groin, inner thighs, folds between buttocks and skin. It was allowed to dry on its own, and not massaged. The product was applied twice a day or before change of diaper after the skin was cleaned and dried on above mentioned areas for the period of 14 days.

The subjects were asked to answer self-assessment questionnaire after 14 days of application of Gel of present invention in order to evaluate the overall appraisal and attitude of the subjects towards the efficacy, cosmetic characteristics of the product under test.

Results were presented in the form of tables of number and frequency of the answers for each proposal. Percentages were calculated by taking into consideration the total number of answers.

Result:
Answers to Some of the Key Self Assessment Questions Given by the Respondents are as Below:

| Questions | Strongly disagree | Somewhat disagreed | Neutral | Somewhat agree | Strongly agree |
| --- | --- | --- | --- | --- | --- |
| Do you feel the investigational product provides relief from rash discomfort? | 0% | 0% | 0% | 40% | 60% |
| Do you feel the investigational product helps in reducing rashes? | 0% | 0% | 0% | 38% | 62% |
| Do you feel the investigational product reduces chafing or rubbing of skin with diaper/cloth? | 0% | 0% | 0% | 40% | 60% |
| For how long does the relief rash discomfort last since application of investigational product | <2 hrs | 2-5 hrs | 5-7 hrs | 8-10 hrs | >10 hrs |
| | 0% | 0% | 68% | 32% | 0% |

Conclusion:

The gel of present invention a silicone-based formulation, was studied for efficacy and safety in a protocol driven home use study of 50 respondents. The gel is 100% efficacious in providing relief from adult diaper rashes and symptoms of diaper rashes. The relief from diaper rash after application of Gel lasts up to 7 hours in 100% of the cases and up to 10 hours in 32% of cases. 100% subjects who used the gel of present invention found it to be safe and does not cause any burning sensation upon its use. 100% of users confirmed it is non-sticky, easy to use and helps skin moisturization. Overall the gel of present invention is safe and efficacious in providing relief from adult diaper rashes Example 8: To Evaluate the Safety, Tolerability and Effectiveness of Gel in Pressure Ulcers

| Subjects | Age | Number of Subjects |
| --- | --- | --- |
| Patients (male or female) | 18 years and above | 12 |

This clinical study was carried out by an independent clinical research organization in hospital and home care setting for bed ridden patients.

Figure 2:
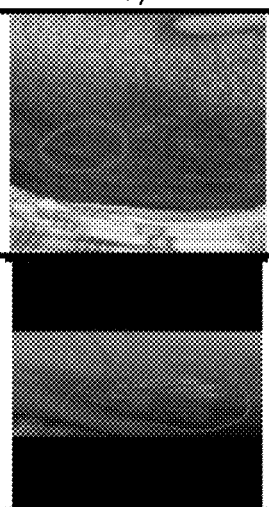
FIG. 2 represents pictorial data of patients with grade 1, 2 and 3 bed sores/pressure ulcers—at day 0 and day 21 after treatment with composition of the present invention (Example 3g) in a clinical study as described in example 8.
Figure 2:
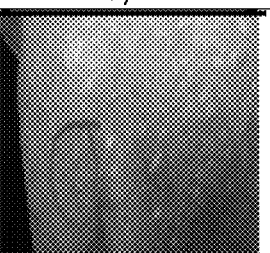
Figure 2:
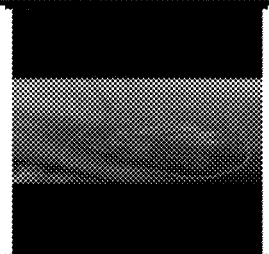
Figure 2:
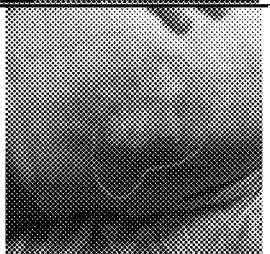
Figure 2:
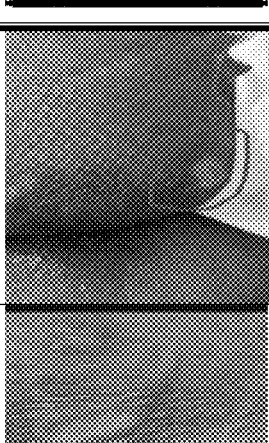
Figure 2:
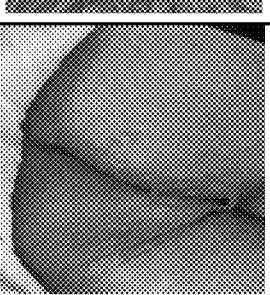
Figure 2:
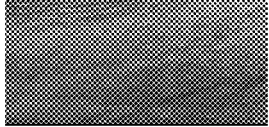
Figure 2:
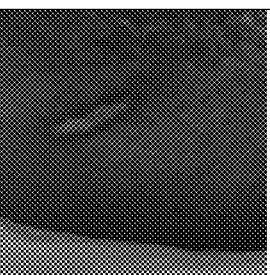
Figure 2:
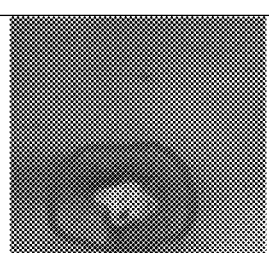
Figure 2:
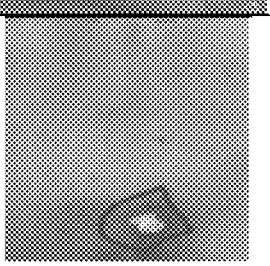
Figure 2:
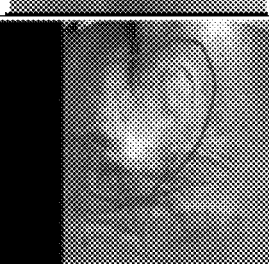
Figure 2:
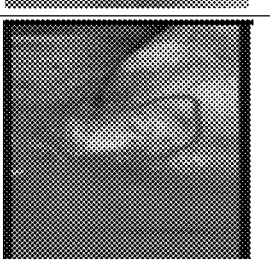

Dose and Mode of administration: Gel of present invention (Example no. 3g) was applied externally in a quantity just sufficient to form a thin film on affected area (area with pressure ulcer/bed sore) or PU prone area and little wider to cover the adjacent areas. While application of IP, the first layer of the product applied, was allowed to dry for a few seconds and then another thin layer on the area was applied. This helped cover all the areas very well. Please note only thin film sufficient to ensure no affected areas were left without film was applied. Gel was applied twice daily for 21 days on ulcerated areas for Grade 1 ulcers as well as area around the ulcer for Grade 2 and 3 ulcers and other ulcer prone areas and given 2-3 min to absorb. Day 1 and Day 21 photographs of some of the pressure ulcers of some of the subjects is shown in FIG. 2.

Criteria for Evaluation:

Primary endpoints Safety and Tolerability • Incidence of adverse events such as erythema, itching, and pain was evaluated. Degrees of overall satisfaction with the treatment using visual analog scale (VAS) Secondary endpoints Efficacy • No worsening of grade 1/grade 2/grade 3 ulcers after 21 days of treatment assessed using Braden scale. • No formation of grade 1 ulcers in other bed sore prone areas using Braden scale. Other Secondary Endpoints • Use of local management pressure system • Time a patient spent during the day in a recumbent/semi-recumbent position and seated in a chair • Frequency of repositioning • Pressure-relieving surfaces used.

Conclusion:

No adverse events were reported during the entire study period. Sensitivity assessments carried out post gel of present invention application at the ulcer area and ulcer prone areas indicated no gel related rash, redness, and/or hives post IP application. All study subjects used generally equal quantity of the application during the study period. These findings demonstrate safety and tolerability of the gel application in home care setting subjects suffering from pressure ulcers. There was no significant change in the overall assessment visual analog scale (VAS) score. However, there were no worsening of ulcers due to any skin reaction on application of gel to surrounding area and/or formation of new ulcers in the ulcer prone areas suggesting that gel of present invention as a good option for prophylactic means. Parameters like time spent during day in recumbent/semi-recumbent positions and frequency of repositioning did not change during the 21-day study period, indicating no worsening of the existing pressure ulcers or development of new ulcers. Braden scale score for predicting pressure ulcer risk remained under mild to moderate risk over the 21-day study period.

The invention claimed is:

1. A method of treating a topical disorder in a human in need thereof comprising administering to the human in need thereof a non-aqueous gel comprising:
   (a) one or more silicone crosspolymers selected from the group consisting of dimethicone/vinyldimethicone crosspolymers, dimethicone crosspolymers, phenylvinyldimethicone crosspolymers, dimethicone/phenylvinyl dimethicone crosspolymers, vinyl dimethicone/methicone silsesquioxane crosspolymers, dimethicone/polyethylene glycol (PEG-10/15) crosspolymers, polyethylene glycol (PEG-15)/Lauryldimethicone crosspolymers and mixtures thereof being present at 1% w/w-30% w/w of the non-aqueous gel;
   (b) a silicone oil being present at about 50% w/w to about 99% w/w of the non-aqueous gel; and
   (c) a sweat or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w of the non-aqueous gel.

2. The method of claim 1, wherein the non-aqueous gel further comprises a non-volatile film forming polymer in about 0.1 to about 25% w/w of the non-aqueous gel.

3. The method of claim 1, wherein the non-aqueous gel further comprises a skin rejuvenating agent or soothing agent in about 0.1 to about 25% w/w of the non-aqueous gel.

4. The method of claim 1, wherein the topical skin disorder is selected from the group consisting of irritation of skin, chafing, razor burn, itching or pruritus, scar rash, diaper rash, athlete's foot, jock itch, ringworm, candidiasis, bedsores, pressure ulcers, dermatitis, dermatitis due to psoriasis, skin lesions, eczema, sunburn, skin atrophy, bruising, acne formation, acne scars, apoptosis, fungal infections, intertrigo, bacterial infections, calluses, warts, corns, photodamage, scars, keloids, lupus, ichthyosis, atopic dermatitis, chronic wounds, keratosis piralis, sebaceous cysts, warts, inflammatory dermatoses, keratosis, eczema, xerosis, lichen planus, nodular prurigo, microbial infection, seborrheic dermatitis, dandruff, miliaria and allergic reactions.

5. The method of claim 1, wherein the topical skin disorder is selected from the group consisting of irritation of skin, chafing, razor burn, itching, scar rash, diaper rash, athlete's foot, jock itch, candidiasis, bedsores, pressure ulcers, intertrigo, dermatitis, fungal infections, and bacterial infections.

6. The method of claim 1, wherein the silicone oil is selected from the group consisting of dimethicone, cyclopentasiloxane, simethicone, methyl dimethicone, methyl trimethicone, phenyl siloxyphenyltrimethicone, trisiloxane, and mixtures thereof.

7. The method of claim 1, wherein the non-aqueous gel comprises:
(a) one or more silicone crosspolymers is selected from the group consisting of dimethicone/vinyldimethicone crosspolymers, dimethicone crosspolymers, cetearyl dimethicone/vinyldimethicone crosspolymer, dimethicone/polyethylene glycol (PEG-10/15) crosspolymers and mixtures thereof being present at 1% w/w-30% w/w of the non-aqueous gel;
(b) a silicone oil is dimethicone, cyclopentasiloxane, and mixtures thereof being present at about 50% w/w to about 99% w/w of the non-aqueous gel; and
(c) a sweat and/or sebum absorbing agent selected from the group consisting of silica silylate, fumed silica, magnesium alumina meta silicate, starch, and combinations thereof being present at 0.1% w/w-25% w/w of the non-aqueous gel.

8. The method of treating a topical skin disorder as claimed in claim 1, wherein the non-aqueous gel is applied to the skin surface of the human in need thereof for a time period ranges from 1 day to 180 days.

9. The method of treating a topical skin disorder as claimed in claim 1, wherein the non-aqueous gel is applied to the skin surface of the human in need thereof once in a day, twice a day or thrice a day.

10. The method as claimed in claim 1, wherein the non-aqueous gel is applied along with any other topical gels, creams, lotions, or solutions.

11. The method as claimed in claim 1, wherein the non-aqueous gel is an anti-chafing gel, and water repellant gel; and the non-aqueous gel composition has water repellency rate of more than 70 when tested by AATCC 22.

12. The method as claimed in claim 1, wherein the non-aqueous gel when applied to the skin of a subject adheres to the skin of the human in need thereof with a work of adhesion of more than about 0.500 Newton·sec when measured by TA.XT plus texture analyzer of Brookfield ProCT3 texture analyser using a mucoadhesive rig.

13. The method as claimed in claim 1, wherein the non-aqueous gel when applied to the skin of the human forms a film with a coefficient of friction of less than 0.400 when measured by Automatic surface tester (method ASTM D 1894).

14. The method of claim 1, wherein the non-aqueous gel when applied onto the skin of the human forms an abrasion resistant film with abrasion resistance of at least 10 cycles as measured by abrasion test IS12673-1989 or ASTM D 3885.

15. The method of claim 2, wherein the non-volatile film forming polymer is trimethylsiloxysilicate.

16. The method of claim 3, wherein the skin rejuvenating agent or soothing agent is selected from the group consisting of curcumin, balloon vine extract, echium oil, blackcurrant seed oil, sunflower oil concentrate, tea tree oil, tulsi, neem oil, coconut oil, olive oil, geranium oil, lavender oil, cinnamon oil, calendula oil, calamine, tocopherol acetate, squalene, squalane, patchouli oil, lemongrass oil, lemon oil and combinations thereof.

17. A method of treating a diaper rash in a human in need thereof comprising contacting the skin surface of a human in need thereof with a non-aqueous gel composition comprising:
(a) one or more silicone crosspolymers selected from the group consisting of dimethicone/vinyldimethicone crosspolymers, dimethicone crosspolymers, phenylvinyldimethicone crosspolymers, dimethicone/phenylvinyl dimethicone crosspolymers, vinyl dimethicone/methicone silsesquioxane crosspolymers, dimethicone/polyethylene glycol (PEG-10/15) crosspolymers, polyethylene glycol (PEG-15)/Lauryldimethicone crosspolymers and mixtures thereof being present at 1% w/w-30% w/w of the non-aqueous gel;
(b) a silicone oil being present at about 50% w/w to about 99% w/w of the non-aqueous gel;
(c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w of the non-aqueous gel; and
(d) a skin rejuvenating agent or soothing agent is selected from the group consisting of curcumin, balloon vine extract, echium oil, blackcurrant seed oil, sunflower oil concentrate, tea tree oil, tulsi, neem oil, coconut oil, olive oil, geranium oil, lavender oil, cinnamon oil, calendula oil, calamine, tocopherol acetate, squalene, squalane, patchouli oil, lemongrass oil, lemon oil and combinations thereof being present at 0.1% w/w-25% w/w of the non-aqueous gel.

18. A method of treating bed sores or pressure ulcers in a human in need thereof comprising contacting the skin surface of a subject in need thereof with a non-aqueous gel comprising:
(a) one or more silicone crosspolymers selected from the group consisting of dimethicone/vinyldimethicone crosspolymers, dimethicone crosspolymers, phenylvinyldimethicone crosspolymers, dimethicone/phenylvinyl dimethicone crosspolymers, vinyl dimethicone/methicone silsesquioxane crosspolymers, dimethicone/polyethylene glycol (PEG-10/15) crosspolymers, polyethylene glycol (PEG-15)/Lauryldimethicone crosspolymers and mixtures thereof being present at 1% w/w-30% w/w of the non-aqueous gel;

(b) a silicone oil being present at about 50% w/w to about 99% w/w of the non-aqueous gel; and (c) a sweat and/or sebum absorbing agent selected from the group consisting of silica silylate, magnesium alumina meta silicate, engineered particles of silica, polysilicic acids, silicic anhydride, fumed silica, hydrated silica, silica gel, silicate esters, silicate salts, starch, and combinations thereof being present at 0.1% w/w-25% w/w of the non-aqueous gel.

\* \* \* \* \*